United States Patent
Tandon et al.

(10) Patent No.: US 11,875,175 B2
(45) Date of Patent: *Jan. 16, 2024

(54) PROVIDING PHYSICAL HOST HARDWARE STATE INFORMATION TO VIRTUAL MACHINES DEPLOYED ON THE PHYSICAL HOST

(71) Applicant: Juniper Networks, Inc., Sunnyvale, CA (US)

(72) Inventors: Abhinav Tandon, Bangalore (IN); Kaustubh Shantanu, Bangalore (IN); Siva Krishna Gudivada, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 238 days.

This patent is subject to a terminal disclaimer.

(21) Appl. No.: 17/443,837

(22) Filed: Jul. 28, 2021

(65) Prior Publication Data

US 2021/0357249 A1    Nov. 18, 2021

Related U.S. Application Data

(63) Continuation of application No. 16/554,051, filed on Aug. 28, 2019, now Pat. No. 11,080,083.

(51) Int. Cl.
*G06F 9/455* (2018.01)
*G06F 9/54* (2006.01)

(52) U.S. Cl.
CPC .......... *G06F 9/45558* (2013.01); *G06F 9/542* (2013.01); *G06F 2009/4557* (2013.01)

(58) Field of Classification Search
None
See application file for complete search history.

(56) References Cited

U.S. PATENT DOCUMENTS

| 8,296,762 | B2 | 10/2012 | Knauerhase et al. |
| 8,429,630 | B2 | 4/2013 | Nickolov et al. |
| (Continued) | | | |

OTHER PUBLICATIONS

Asthana., et al., "A Declarative Approach for Service Enablement on Hybrid Cloud Orchestration Engines," NOMS 2018—2018 IEEE/IFIP Network Operations and Management Symposium, Taipei, Taiwan, 2018, 7 pages.

(Continued)

*Primary Examiner* — Van H Nguyen
(74) *Attorney, Agent, or Firm* — Harrity & Harrity, LLP

(57) ABSTRACT

A device may receive, from a virtual machine deployed on the device, a request to register for an event associated with a hardware component of the device, and may create a path to a script associated with providing information about the event when the event occurs. The device may provide the script to an event plugin associated with the event and the hardware component, and may register the event plugin with a kernel associated with the device. The device may receive, the kernel, information indicating occurrence of the event associated with the hardware component, and may cause, via the event plugin, execution of the script based on the occurrence of the event associated with the hardware component. The device may provide, based on execution of the script, a notification to the virtual machine, where the notification may indicate the occurrence of the event associated with the hardware component.

20 Claims, 14 Drawing Sheets

(56) References Cited

U.S. PATENT DOCUMENTS

| | | | |
|---|---|---|---|
| 8,830,870 | B2 | 9/2014 | Cardona et al. |
| 8,843,935 | B2 * | 9/2014 | Hegdal .............. G06F 9/45558 |
| | | | 718/1 |
| 9,170,798 | B2 * | 10/2015 | Nagaraja .............. G06F 3/0486 |
| 9,843,487 | B2 * | 12/2017 | Mordani ............. H04L 41/5041 |
| 9,875,134 | B2 | 1/2018 | Gabrielson et al. |
| 10,007,534 | B2 | 6/2018 | Williams et al. |
| 10,114,834 | B2 * | 10/2018 | Yin ....................... H04L 67/131 |
| 10,133,619 | B1 | 11/2018 | Nagpal et al. |
| 10,171,373 | B2 | 1/2019 | Hegdal et al. |
| 10,284,574 | B1 | 5/2019 | Aziz et al. |
| 10,452,421 | B2 | 10/2019 | Allen |
| 10,476,809 | B1 | 11/2019 | Daniel et al. |
| 10,803,766 | B1 * | 10/2020 | Donovan ........... G09B 19/0053 |
| 11,080,083 | B1 | 8/2021 | Tandon |
| 2007/0271560 | A1 | 11/2007 | Wahlert et al. |
| 2017/0123839 | A1 | 5/2017 | Bugenhagen |

OTHER PUBLICATIONS

Nemati., et al., "VM Processes State Detection by Hypervisor Tracing," 2018 Annual IEEE International Systems Conference (SysCon), Vancouver, BC, Canada, 2018, 8 pages.

WEINGARTNER., et al., "A Distributed Autonomic Management Framework for Cloud Computing Orchestration," 2016 IEEE World Congress on Services (Services), San Francisco, CA, USA, 2016, pp. 9-17.

* cited by examiner

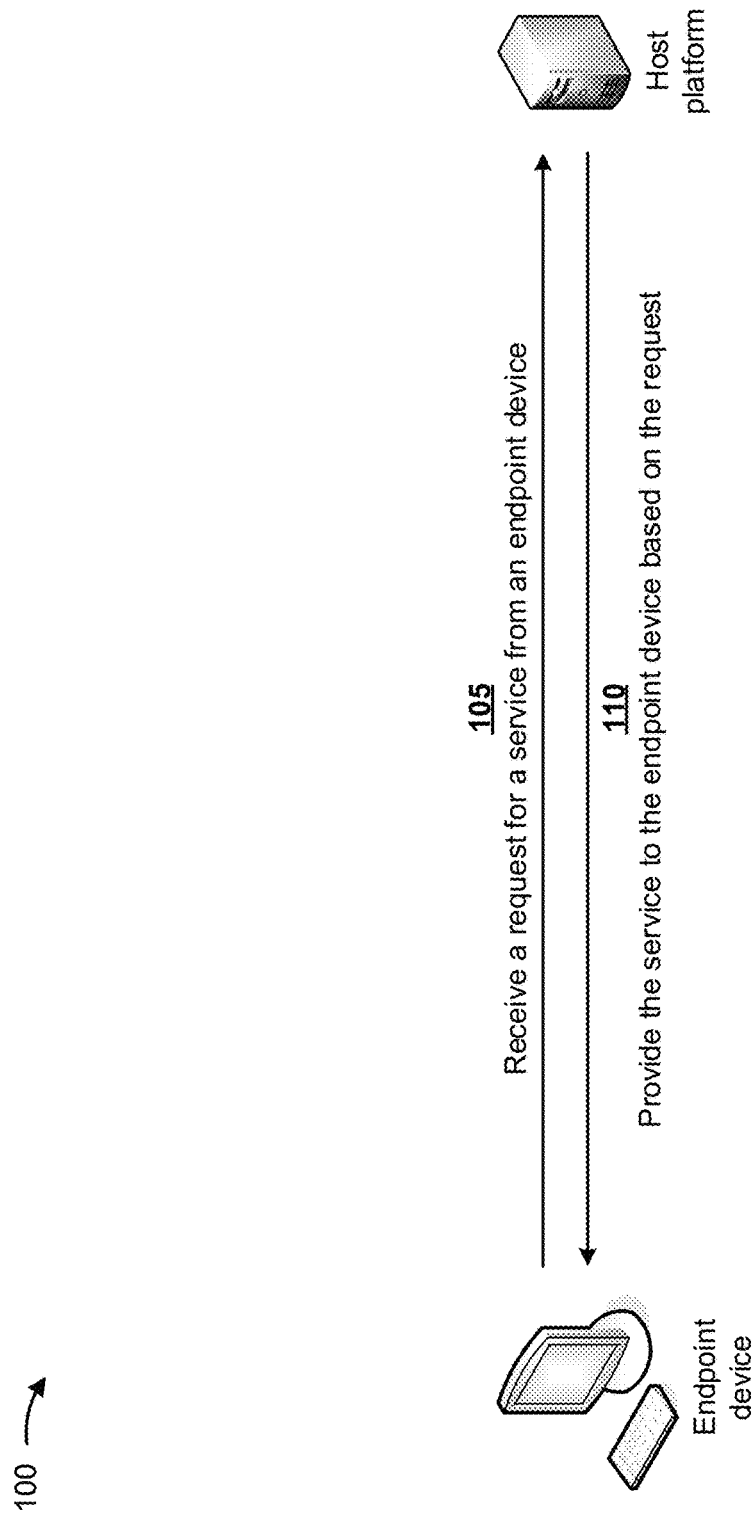

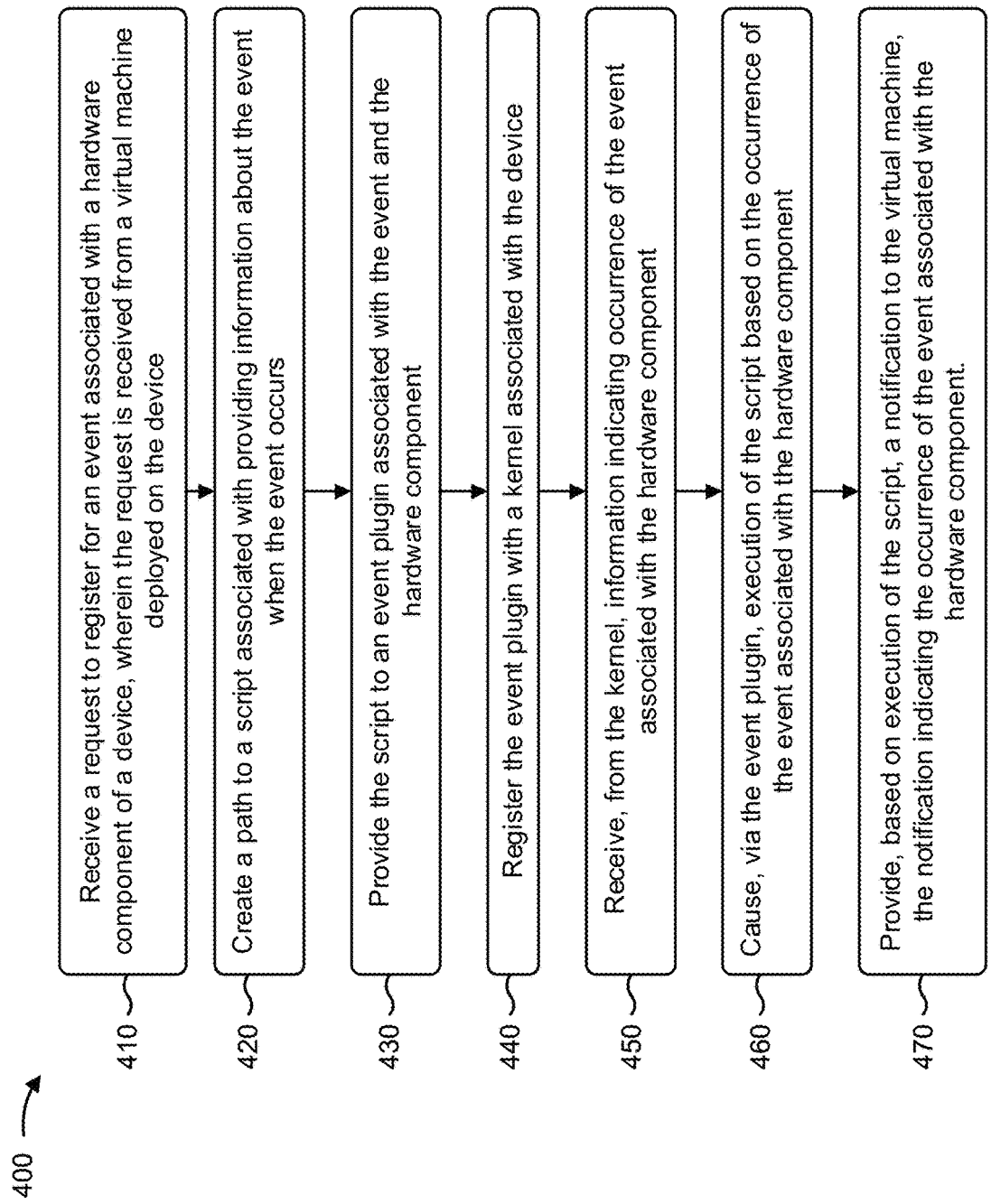

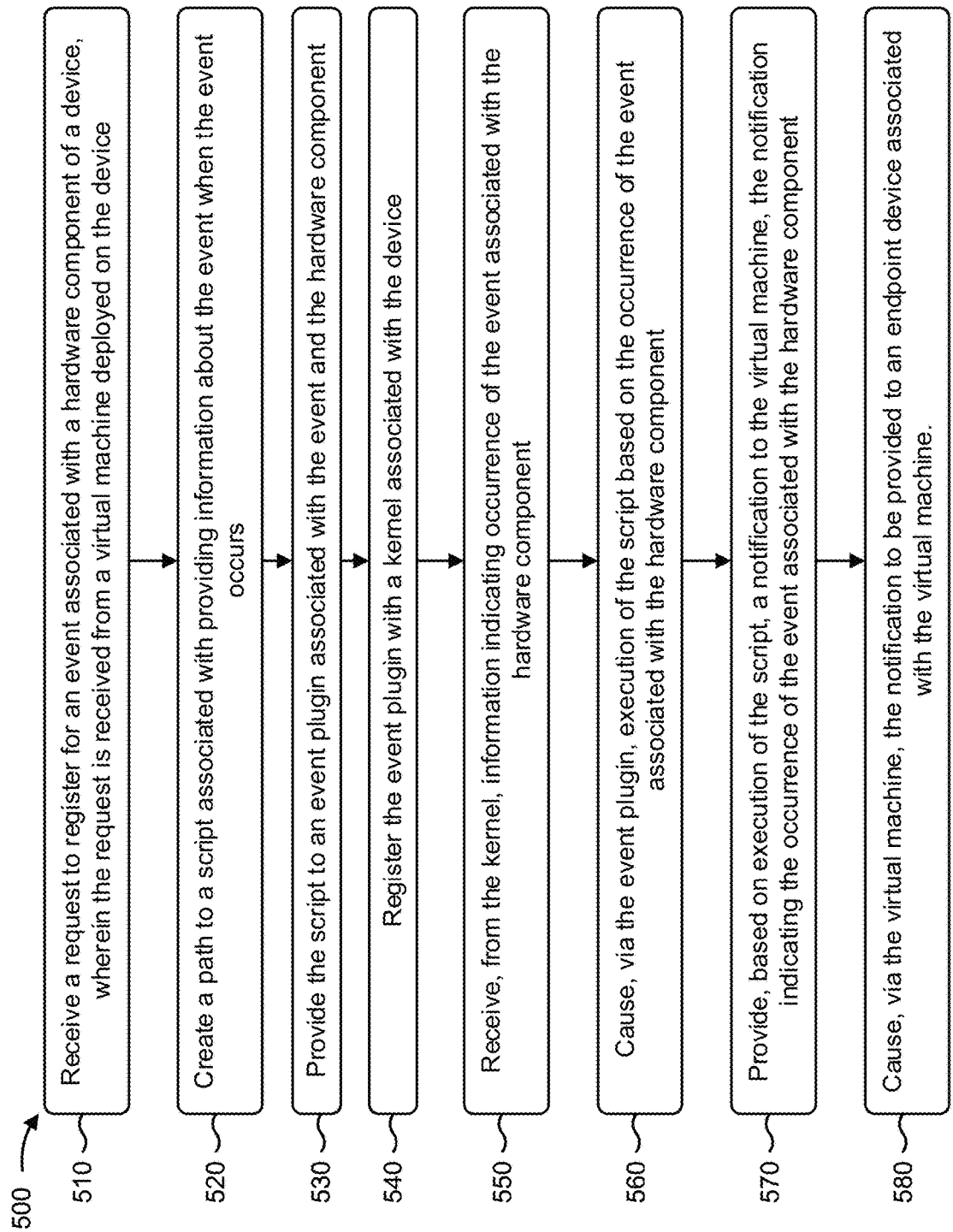

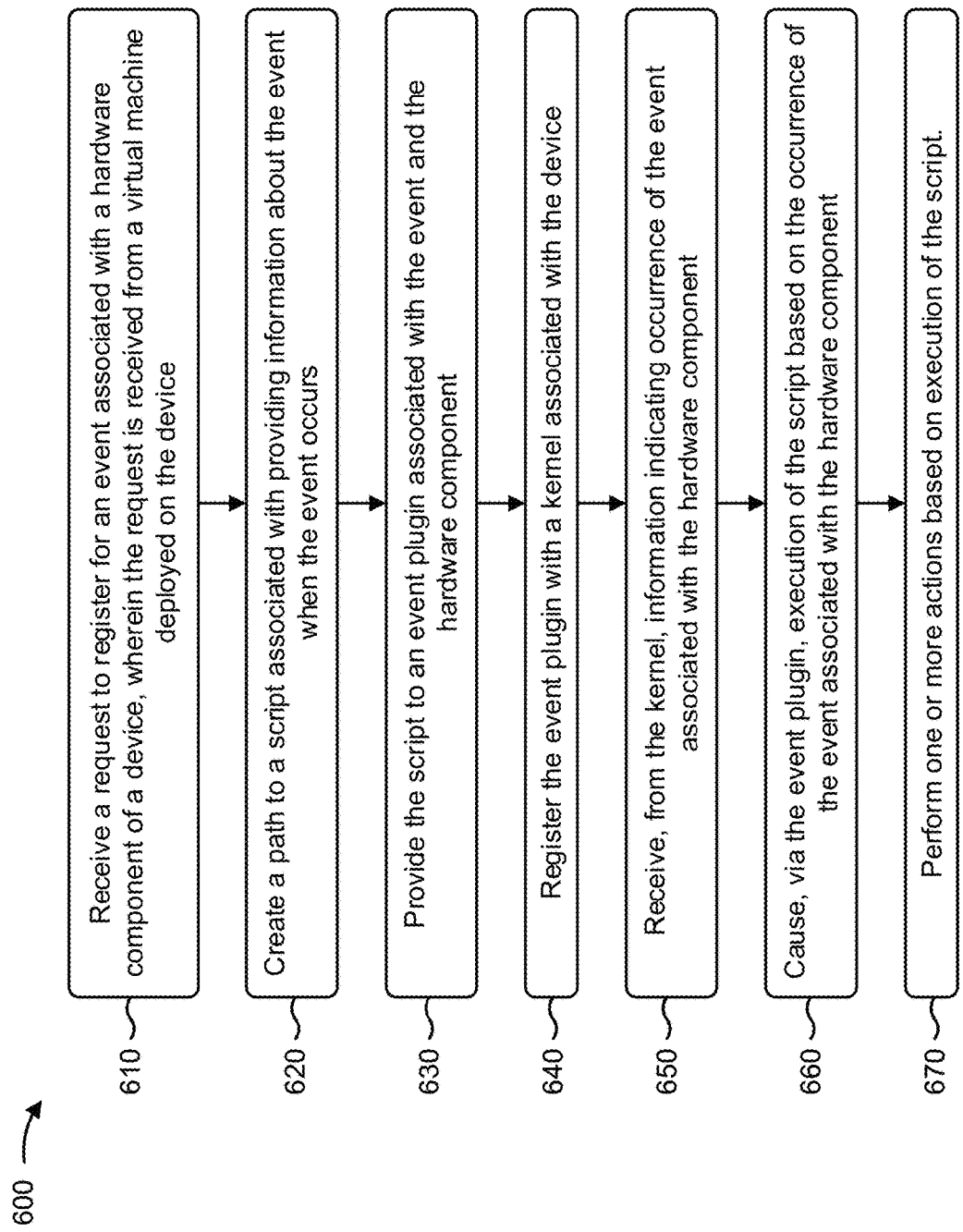

PROVIDING PHYSICAL HOST HARDWARE STATE INFORMATION TO VIRTUAL MACHINES DEPLOYED ON THE PHYSICAL HOST

RELATED APPLICATION

This application is a continuation of U.S. patent application Ser. No. 16/554,051, filed Aug. 28, 2019 (now U.S. Pat. No. 11,080,083), which is incorporated herein by reference in its entirety.

BACKGROUND

A customer may utilize one or more virtual machines deployed within a cloud computing environment to access one or more services, such as computation, software, data access, storage, and/or the like, services.

SUMMARY

According to some implementations, a method may include receiving a request to register for an event associated with a hardware component of the device, wherein the request is received from a virtual machine deployed on the device, and creating a path to a script associated with providing information about the event when the event occurs. The method may include providing the script to an event plugin associated with the event and the hardware component, and registering the event plugin with a kernel associated with the device. The method may include receiving, from the kernel, information indicating occurrence of the event associated with the hardware component, and causing, via the event plugin, execution of the script based on the occurrence of the event associated with the hardware component. The method may include providing, based on execution of the script, a notification to the virtual machine, the notification indicating the occurrence of the event associated with the hardware component.

According to some implementations, a device may include one or more memories, and one or more processors, communicatively coupled to the one or more memories, to receive a request to register for an event associated with a hardware component of the device, wherein the request is received from a virtual machine deployed on the device. The one or more processors may create a path to a script associated with providing information about the event when the event occurs, and may provide the script to an event plugin associated with the event and the hardware component. The one or more processors may register the event plugin with a kernel associated with the device, and may receive, from the kernel, information indicating occurrence of the event associated with the hardware component. The one or more processors may cause, via the event plugin, execution of the script based on the occurrence of the event associated with the hardware component, and may provide, based on execution of the script, a notification to the virtual machine, the notification indicating the occurrence of the event associated with the hardware component. The one or more processors may cause, via the virtual machine, the notification to be provided to an endpoint device associated with the virtual machine.

According to some implementations, a non-transitory computer-readable medium may store one or more instructions that, when executed by one or more processors of a device, may cause the one or more processors to receive a request to register for an event associated with a hardware component of the device, wherein the request is received from a virtual machine deployed on the device. The one or more instructions may cause the one or more processors to create a path to a script associated with providing information about the event when the event occurs, and provide the script to an event plugin associated with the event and the hardware component. The one or more instructions may cause the one or more processors to register the event plugin with a kernel associated with the device, and receive, from the kernel, information indicating occurrence of the event associated with the hardware component. The one or more instructions may cause the one or more processors to cause, via the event plugin, execution of the script based on the occurrence of the event associated with the hardware component, and perform one or more actions based on execution of the script.

BRIEF DESCRIPTION OF THE DRAWINGS

FIGS. 1A-1I are diagrams of one or more example implementations described herein.

FIGS. 4-6 are flow charts of example processes for providing physical host hardware state information to virtual machines deployed on the physical host.

DETAILED DESCRIPTION

Figure 1B:
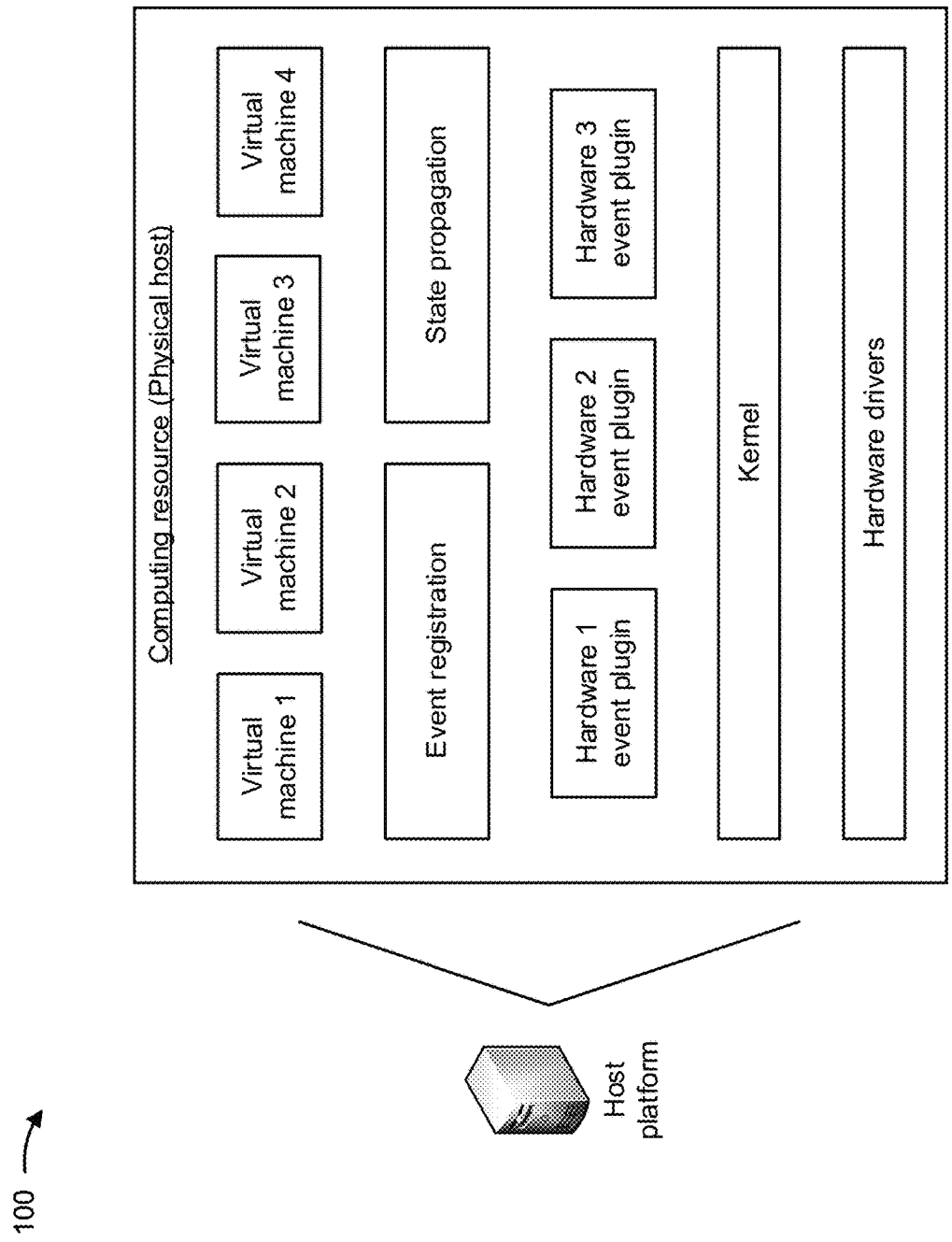

The following detailed description of example implementations refers to the accompanying drawings. The same reference numbers in different drawings may identify the same or similar elements.

A customer utilizing a cloud computing environment may need to know information about a physical host (e.g., a computing resource of the cloud computing environment) where a virtual machine, utilized by the customer, is deployed. Thus, the virtual machine may need to obtain the information about the physical host. Information about the physical host may include physical host information that remains unchanged during a lifetime of the virtual machine, such as information identifying a location of the physical host, a time zone associated with the physical host, a proprietary version or mode associated with the physical host, and/or the like; physical host information that may change during the lifetime of the virtual machine, such as information identifying a name of the physical host executing the virtual machine, a software package version associated with the physical host, a current load on the physical host, malfunctioning hardware on the physical host, and/or the like. Currently, however, a virtual machine is unable to obtain such information from the physical host. For example, virtual machines are unaware when a processor of the physical host is congested or overloaded, when the processor encounters a hardware fault, when disk errors occur on the physical host, when physical link errors occur (e.g., since traffic is dropped on the physical host), when interfaces are unplugged and/or plugged in, when the physical host experiences power supply and/or temperature issues, and/or the like. Furthermore, users of the virtual machines may be interested in receiving notifications for events (e.g., hardware faults and/or failures, configuration changes, and/or the like) that may occur on the host, but are currently unable to receive such notifications.

Without such information, the virtual machine may be unaware of issues associated with the physical host until the virtual machine ceases performance or experiences degraded performance due to such issues (e.g., that cause traffic to be lost, cause traffic to be delayed, require re-routing of traffic, and/or the like). This, in turn, wastes computing resources (e.g., processing resources, memory resources, and/or the like), networking resources, and/or the like associated with identifying and/or correcting the issues associated with the physical host, identifying and/or correcting the traffic outage, re-routing traffic, locating lost traffic, and/or the like.

Some implementations described herein provide a host platform that provides physical host hardware state information to virtual machines deployed on the physical host. For example, the host platform may receive a request to register for an event associated with a hardware component of the device, wherein the request may be received from a virtual machine deployed on the device. The host platform may create a path to a script associated with providing information about the event when the event occurs, and may provide the script to an event plugin associated with the event and the hardware component. The host platform may cause the one or more processors to register the event plugin with a kernel associated with the device, and may receive, from the kernel, information indicating occurrence of the event associated with the hardware component. The host platform may cause, via the event plugin, execution of the script based on the occurrence of the event associated with the hardware component, and may perform one or more actions based on execution of the script.

In this way, a virtual machine may be aware of information and/or issues associated with a physical host providing the virtual machine, which reduces or prevents traffic outages for the virtual machine (e.g., that cause traffic to be lost, cause traffic to be delayed, require re-routing of traffic, and/or the like). This, in turn, conserves computing resources (e.g., processing resources, memory resources, and/or the like), networking resources, and/or the like that would otherwise be wasted in identifying and/or correcting the issues associated with the physical host, identifying and/or correcting the traffic outage, re-routing traffic, locating lost traffic, and/or the like.

FIGS. 1A-1I are diagrams of one or more example implementations 100 described herein. As shown in FIG. 1A, an endpoint device may be associated with a host platform. For example, the host platform may be a cloud computing environment that includes computing resources to provide cloud services to the endpoint device. As further shown in FIG. 1A, and by reference number 105, the host platform may receive a request for a service (e.g., a cloud service) from the endpoint device. The host platform may process the request and may utilize a computing resource (e.g., with one or more virtual machines) to provide the service. For example, based on the request for the service, the host platform may set up a virtual machine on a computing resource (e.g., a physical host). As further shown in FIG. 1A, and by reference number 110, the host platform may provide the service to the endpoint device based on the request.

As shown in FIG. 1B, a computing resource (e.g., a physical host) may include one or more virtual machines, an event registration component, a state propagation component, one or more hardware event plugins, a kernel, and one or more hardware drivers. A virtual machine may include a software implementation of a machine (e.g., a computer) that executes programs like a physical machine. The computing resource is shown with four virtual machines (e.g., virtual machine 1, virtual machine 2, virtual machine 3, and virtual machine 4), but may include more or fewer virtual machines than depicted in FIG. 1B.

The event registration component may include a component that provides an application programming interface (API) for handling requests from virtual machines to register for a particular event (e.g., associated with hardware components of the computing resource). Further details of the event registration component are provided below.

The state propagation component may include one or more callback scripts to be executed when particular events are triggered. The one or more callback scripts may be pre-existing default scripts provided by the computing resources, or may be provided by one or more virtual machines on a shared file system between the computing resource and the one or more virtual machines. Further details of the state propagation component are provided below.

The hardware event plugins may include plugins specific to different hardware (e.g., different hardware components, such as processors, memory, sensors, power supplies, and/or the like) located on the computing resource. The computing resource is shown with three hardware event plugins (e.g., a hardware 1 event plugin associated with hardware 1, a hardware 2 event plugin associated with hardware 2, and a hardware 3 event plugin associated with hardware 3), but may include more or fewer hardware event plugins than depicted in FIG. 1B. The hardware event plugins may encapsulate details from the kernel and may identify different hardware events. Further details of the hardware event plugins are provided below.

The kernel may include a computer program that is a core of an operating system of the computing resource. The kernel may have complete control over everything in the computing resource, and may manage start-up of the computing resource, input/output requests from software, translating input/output requests into data-processing instructions, memory, and/or the like. The hardware drivers may include computer programs that operate and/or control hardware components associated with the computing resource. The hardware drivers may provide software interfaces to the hardware components, and may enable operating systems and other computer programs to access the hardware components.

Figure 1C:
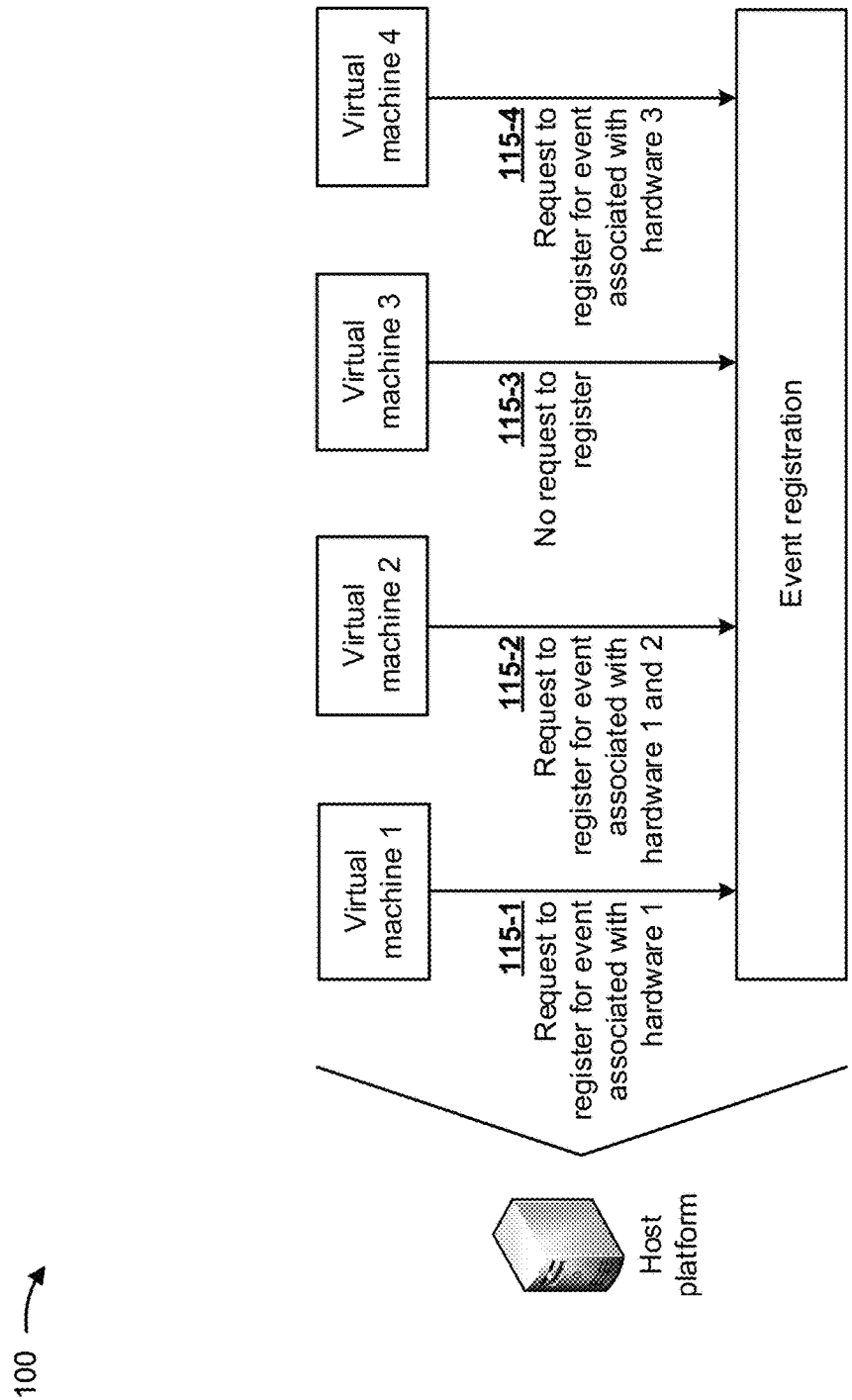

As shown in FIG. 1C, the event registration component may receive, from one or more virtual machines, requests to register for events associated with hardware components of the computing resource. In some implementations, the hardware components may include a bus, a processor, a memory, a storage component, an input component, an output component, a communication interface, and/or the like. In some implementations, an event may occur when a threshold associated with the hardware component is satisfied. For example, an event may include a load associated with a hardware component exceeding a predetermined load threshold, (e.g., a processor experiencing overload conditions); a temperature of a hardware component exceeding a predetermined temperature threshold (e.g., a power supply overheating); a utilization of a hardware component exceeding a predetermined utilization threshold (e.g., an interface receiving more traffic than the interface can process); and/or the like.

In some implementations, the event registration component may receive multiple requests to register for multiple events from a single virtual machine, may receive requests to register for events from multiple virtual machines, may receive requests to register for multiple events associated with a single hardware component or multiple hardware components, and/or the like via an API. For example, as shown in FIG. 1C, and by reference number 115-1, the event registration component may receive, from a first virtual machine (e.g., virtual machine 1), a request to register for an event associated with a first hardware component (e.g., hardware 1) of the computing resource. As further shown in FIG. 1C, and by reference number 115-2, the event registration component may receive, from a second virtual machine (e.g., virtual machine 2), a request to register for an event associated with hardware 1 and a second hardware component (e.g., hardware 2) of the computing resource. As shown by reference number 115-3, the event registration component may not receive a request to register for an event from a third virtual machine (e.g., virtual machine 3). As shown by reference number 115-4, the event registration component may receive, from a fourth virtual machine (e.g., virtual machine 4), a request to register for an event associated with a third hardware component (e.g., hardware 3) of the computing resource.

Figure 1D:
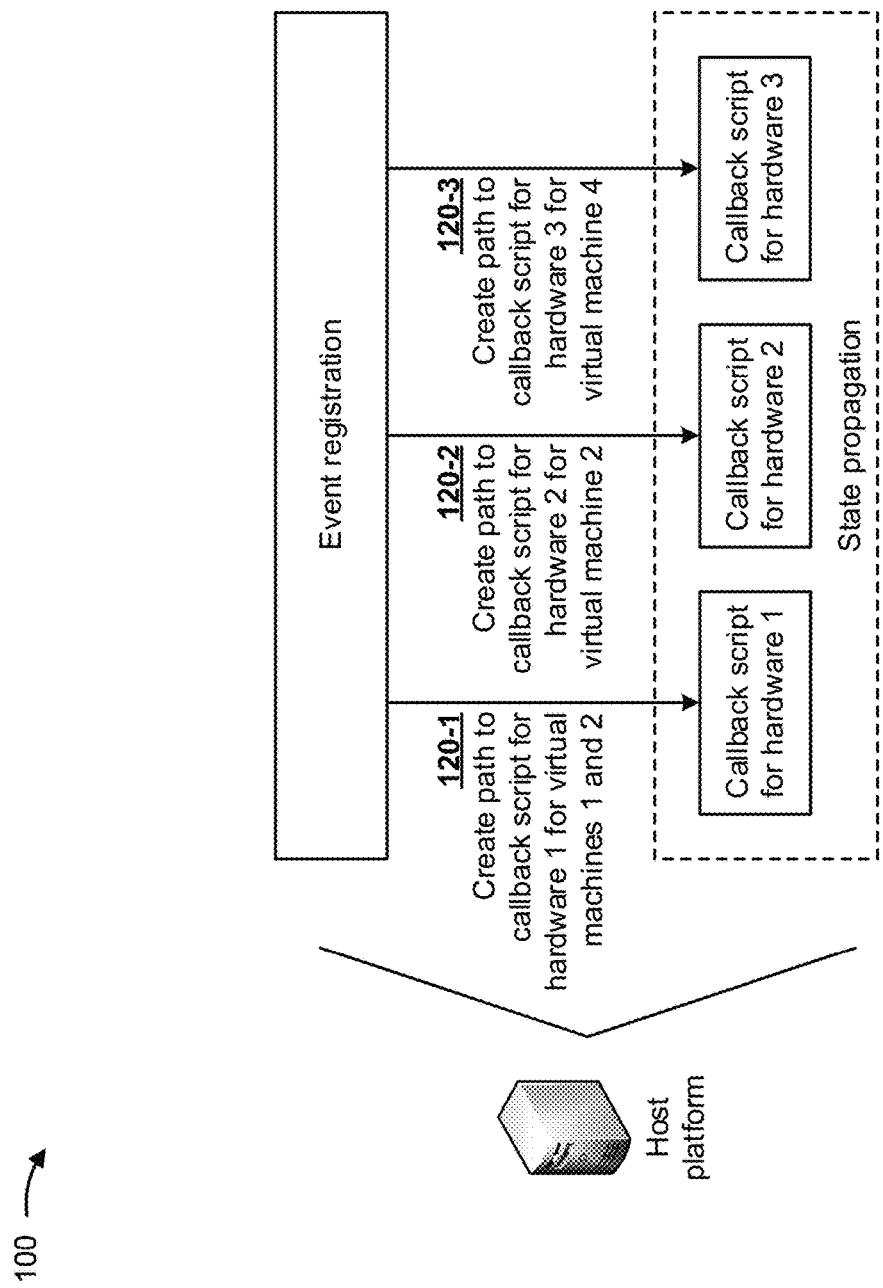

As shown in FIG. 1D, the event registration component may create paths to (e.g., identify locations of) callback scripts associated with providing information about events when the events occur. The callback scripts may include one or more commands that cause information about the events, when the events occur, to be provided to one or more of the virtual machines that registered for the receiving information about the events. As shown in FIG. 1D, and by reference number 120-1, the event registration component may create a path to a callback script for the first hardware component (e.g., hardware 1) for the first virtual machine (e.g., virtual machine 1) and the second virtual machine (e.g., virtual machine 2). As further shown in FIG. 1D, and by reference number 120-2, the event registration component may create a path to a callback script for the second hardware component (e.g., hardware 2) for the second virtual machine (e.g., virtual machine 2). As shown by reference number 120-3, the event registration component may create a path to a callback script for the third hardware component (e.g., hardware 3) for the fourth virtual machine (e.g., virtual machine 4).

In some implementations, the host platform may receive one or more of the callback scripts from one or more of the virtual machines. For example, an endpoint device may cause a virtual machine to program virtual machine-specific callback scripts into the host platform. In this example, the virtual machine, at the time of boot-up, may be supplied with an Internet protocol (IP) port number of the state propagation component executing on the host platform (e.g., on the computing resource). The virtual machine may dynamically provide the callback scripts to the state propagation component via a system management basic input/output system (SMBIOS) string.

In some implementations, the callback scripts may be predefined by the host platform in a guest operating system associated with the host platform. The host platform may provide the callback scripts to the state propagation component without requiring input from a virtual machine. For example, an orchestrator component of the host platform may supply the callback scripts specific to one or more of the virtual machines. The orchestrator component may include an application that provisions, deploys, and/or starts computing resources; acquires and/or assigns storage capacity for computing resources; manages networking for the host platform; create virtual machines; acquires access to specific software on the host platform; integrates permission checks for security and compliance; and/or the like.

Figure 1E:
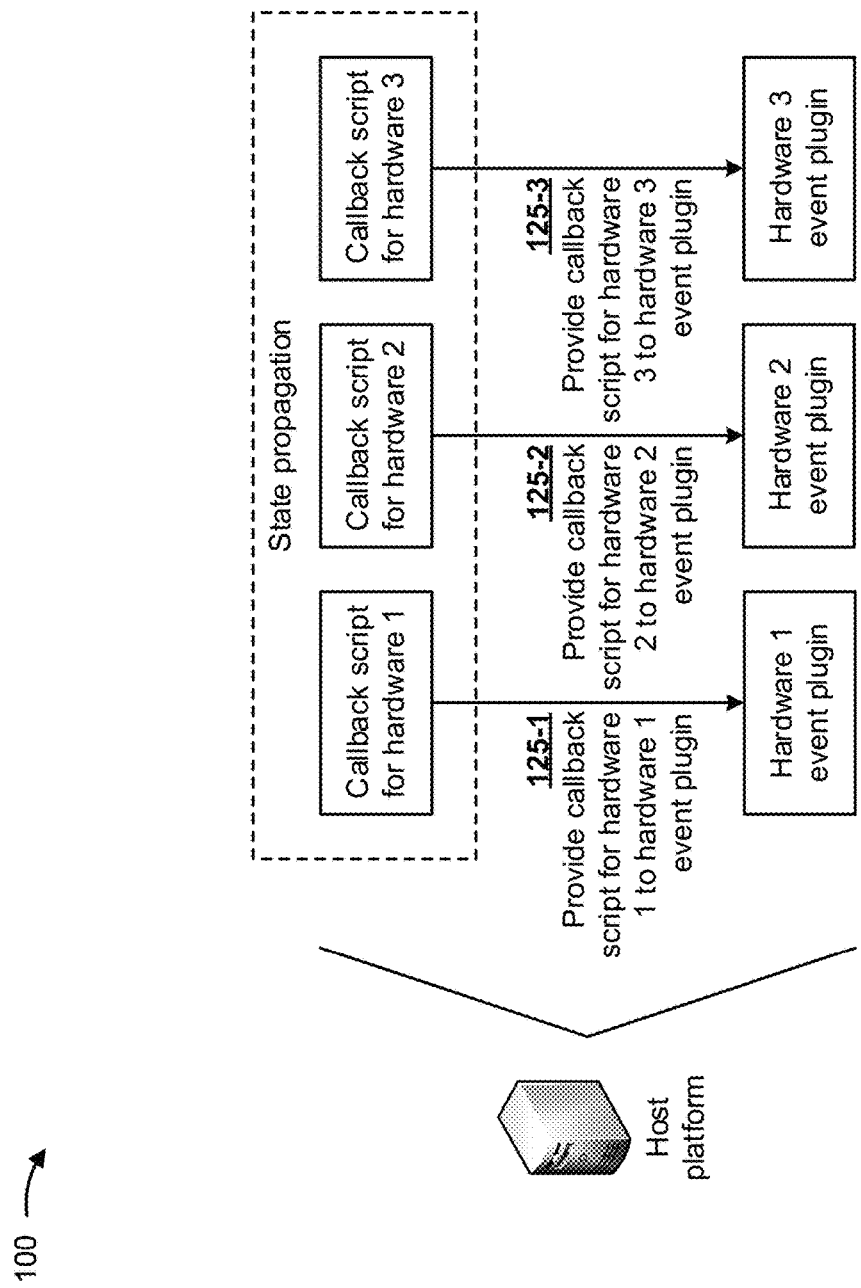

As shown in FIG. 1E, the state propagation component may provide the callback scripts to event plugins associated with the events and the hardware components. For example, as shown in FIG. 1E, and by reference number 125-1, the state propagation component may provide the callback script for the first hardware component (e.g., hardware 1) to the hardware 1 event plugin. As shown by reference number 125-2, the state propagation component may provide the callback script for the second hardware component (e.g., hardware 2) to the hardware 2 event plugin. As shown by reference number 125-3, the state propagation component may provide the callback script for the third hardware component (e.g., hardware 3) to the hardware 3 event plugin.

Figure 1F:
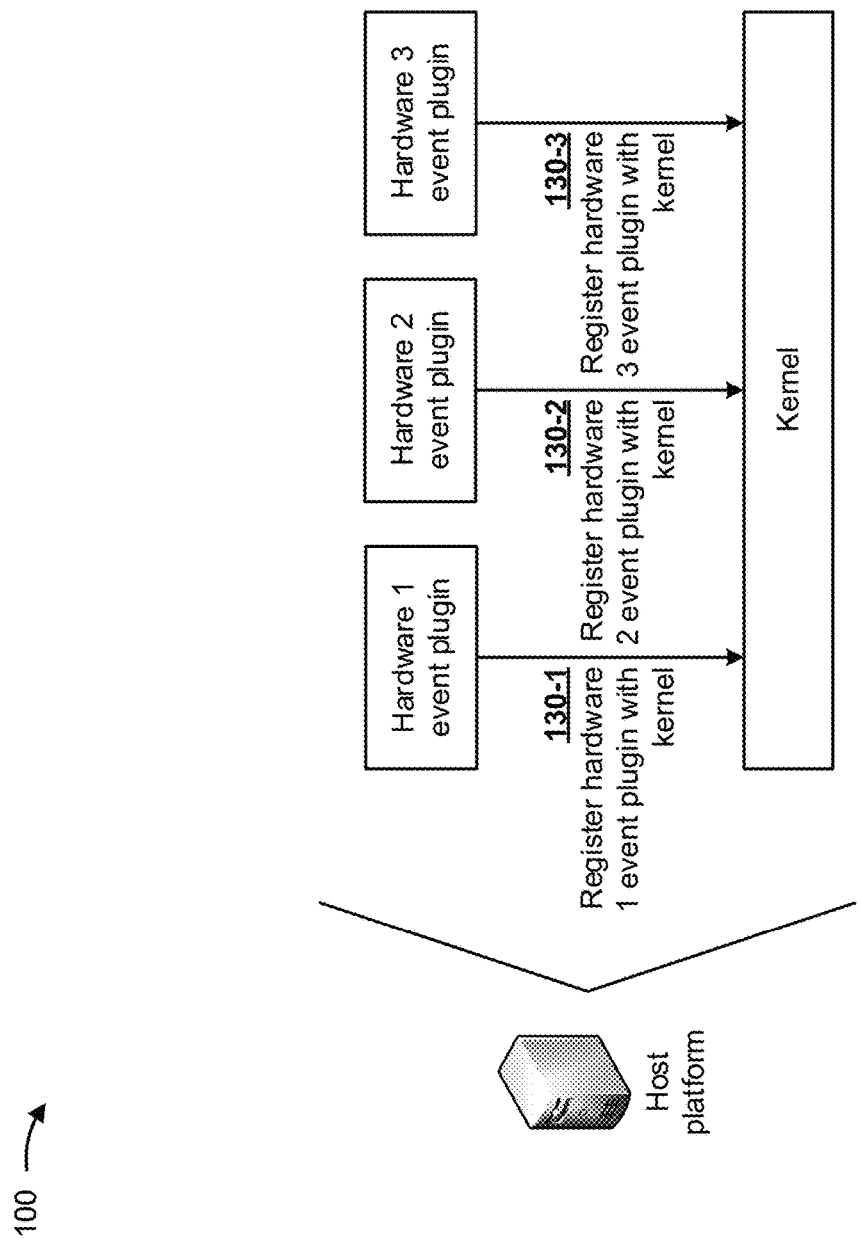

As shown in FIG. 1F, the host platform may register the hardware event plugins with the kernel. In some implementations, the host platform may identify, for the kernel, locations of the hardware event plugins, events associated with each of the hardware event plugins, hardware components associated with each of the hardware event plugins, and/or the like. For example, as shown in FIG. 1F, and by reference number 130-1, the host platform may register the hardware 1 event plugin with the kernel (e.g., by identifying, for the kernel, a location of the hardware 1 event plugin, the event associated with the hardware 1 event plugin, and the first hardware component). As shown by reference number 130-2, the host platform may register the hardware 2 event plugin with the kernel (e.g., by identifying, for the kernel, a location of the hardware 2 event plugin, the event associated with the hardware 2 event plugin, and the second hardware component). As further shown in FIG. 1F, and by reference number 130-3, the host platform may register the hardware 3 event plugin with the kernel (e.g., by identifying, for the kernel, a location of the hardware 3 event plugin, the event associated with the hardware 3 event plugin, and the third hardware component).

Figure 1G:
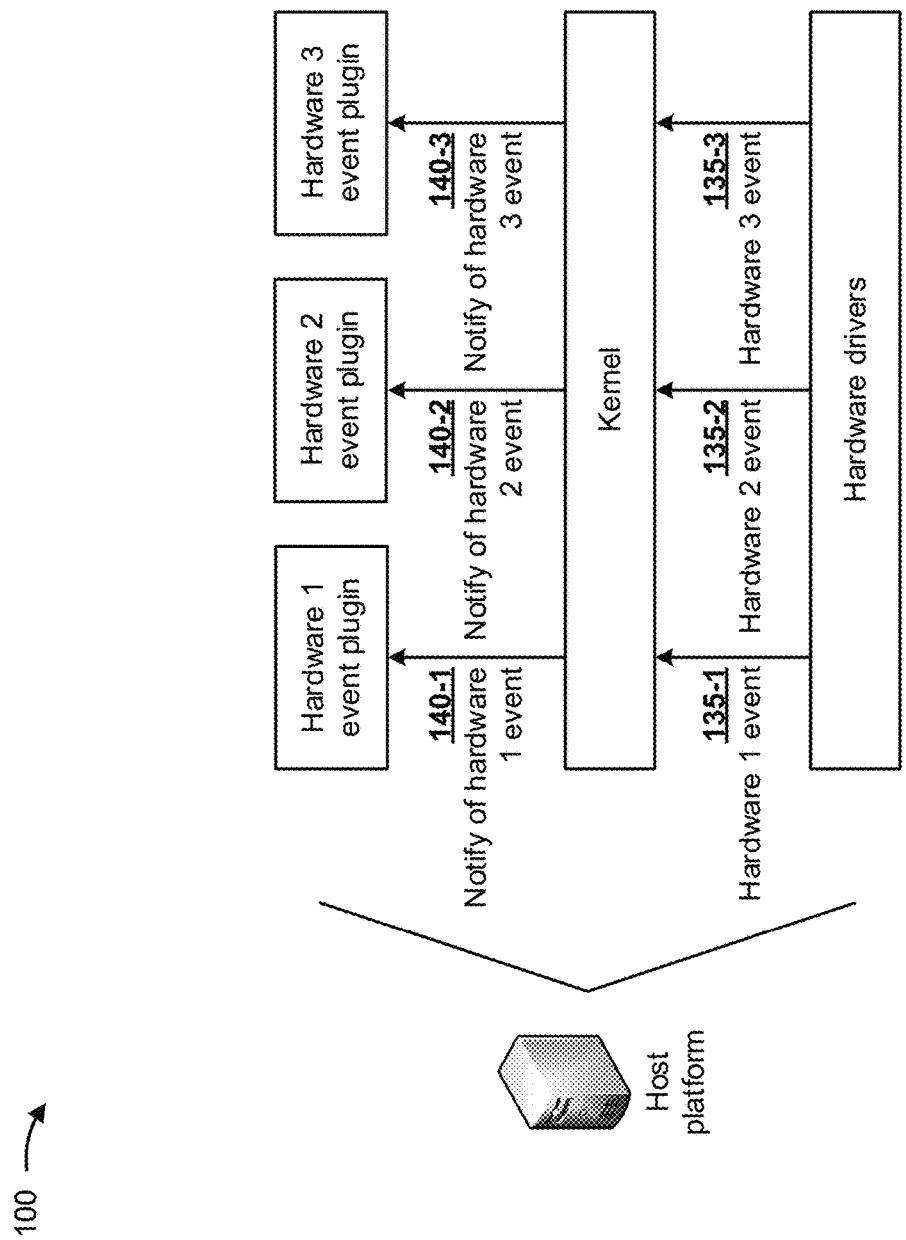

As shown in FIG. 1G, the hardware drivers may generate information indicating occurrence of events associated with the hardware components. In some implementations, the hardware drivers may monitor the hardware components for events (e.g., a processor exceeding a load threshold, a temperature of a power supply exceeding a temperature threshold, an interface exceeding a utilization threshold, and/or the like). When events occurs are detected based on monitoring, the hardware drivers may generate the information indicating the occurrence of the events associated with the hardware components. The hardware drivers may provide the information indicating the occurrence of the events associated with the hardware components to the kernel. In some implementations, the hardware drivers may provide, to the kernel, information associated with all events associated with the hardware components, and the kernel may discard information about events not associated with the hardware event plugins that are registered with the kernel. In some implementations, the hardware drivers may provide, to the kernel, information about events associated with the hardware event plugins that are registered with the kernel. In such implementations, the hardware drivers may receive, from the kernel, information identifying the hardware event plugins that are registered with the kernel.

As further shown in FIG. 1G, and by reference number 135-1, the kernel may receive, from the hardware drivers, information indicating occurrence of an event associated with the first hardware component (e.g., hardware 1 event). As shown by reference number 135-2, the kernel may receive, from the hardware drivers, information indicating occurrence of an event associated with the second hardware component (e.g., hardware 2 event). As shown by reference number 135-3, the kernel may receive, from the hardware drivers, information indicating occurrence of an event associated with the third hardware component (e.g., hardware 3 event).

As further shown in FIG. 1G, and as shown by reference number 140-1, the kernel may notify (e.g., provide a notification to) the hardware 1 event plugin about the hardware 1 event. In some implementations, the notification may indicate that an event associated with the hardware 1 event plugin occurred in the first hardware component (e.g., a processor experienced an overload condition). As shown by reference number 140-2, the kernel may notify (e.g., provide a notification to) the hardware 2 event plugin about the hardware 2 event. In some implementations, the notification may indicate that an event associated with the hardware 2 event plugin occurred in the second hardware component (e.g., a memory exceeded a capacity threshold). As shown by reference number 140-3, the kernel may notify (e.g., provide a notification to) the hardware 3 event plugin about the hardware 3 event. In some implementations, the notification may indicate that an event associated with the hardware 3 event plugin occurred in the third hardware component (e.g., a temperature sensor exceeded a temperature threshold).

Figure 1H:
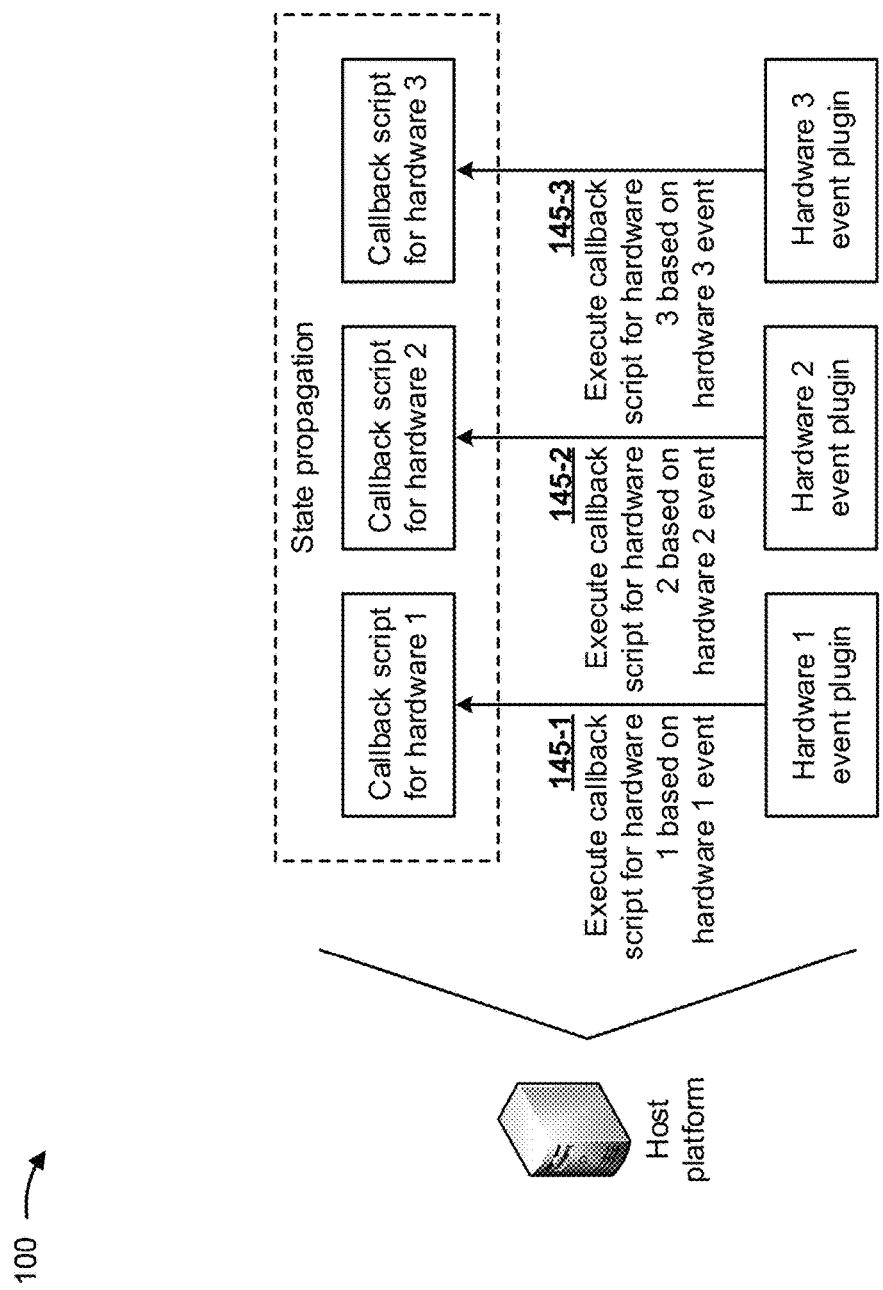

As shown in FIG. 1H, the host platform may cause, via the hardware event plugins, execution of the callback scripts based on the occurrences of the events associated with the hardware components (e.g., the first hardware component, the second hardware component, and the third hardware component). For example, as shown in FIG. 1H, and by reference number 145-1, the hardware 1 event plugin may cause the callback script for the first hardware component (e.g., hardware 1) to be executed based on the hardware 1 event. As shown by reference number 145-2, the hardware 2 event plugin may cause the callback script for the second hardware component (e.g., hardware 2) to be executed based on the hardware 2 event. As further shown in FIG. 1H, and by reference number 145-3, the hardware 3 event plugin may cause the callback script for the third hardware component (e.g., hardware 3) to be executed based on the hardware 3 event.

Figure 1I:
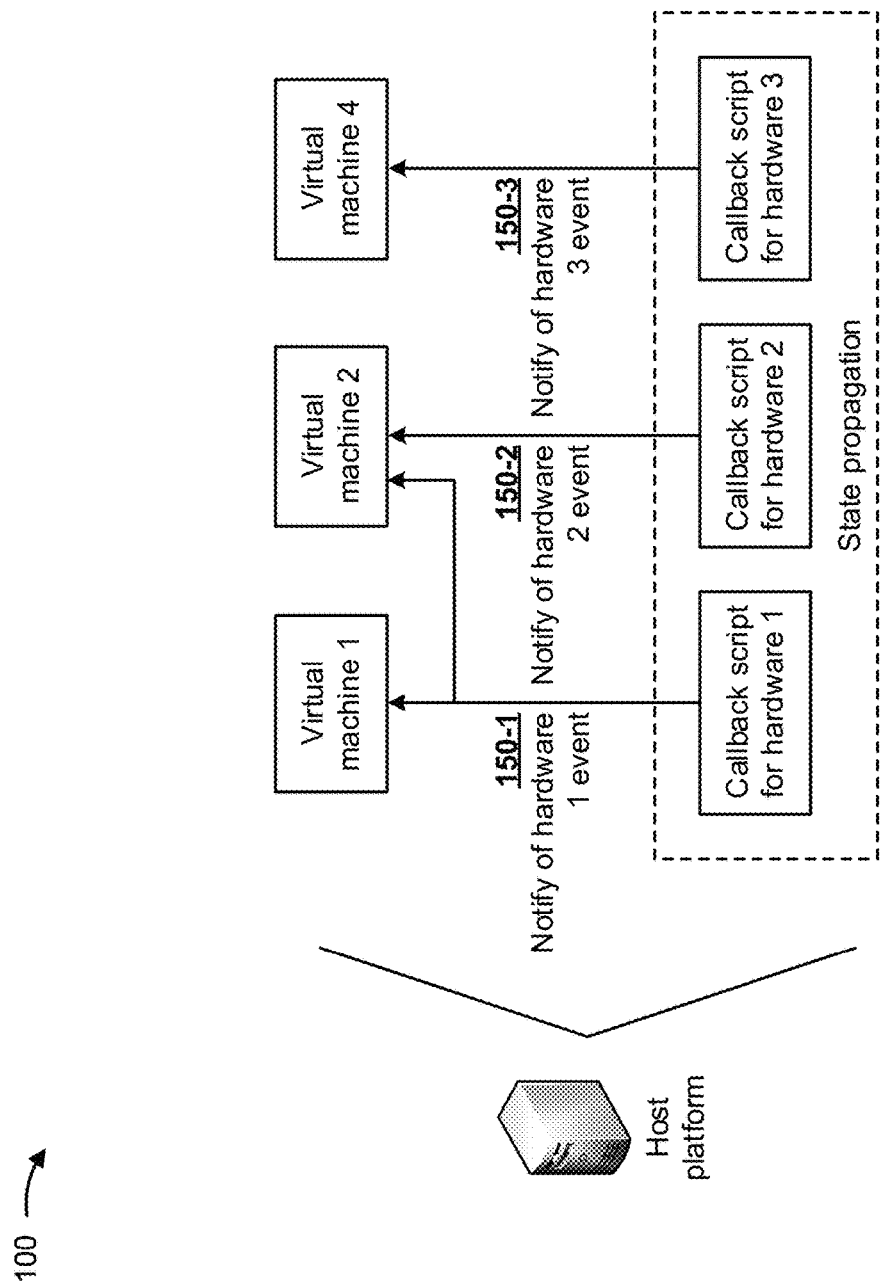

As shown in FIG. 1I, the state propagation component, based on execution of the callback scripts, may notify (e.g., provide notifications to) the virtual machines about the occurrences of the events associated with the hardware components. In some implementations, the host platform may cause, via one or more of the virtual machines, one or more of the notifications to be provided to one or more endpoint devices associated with the one or more virtual machines. For example, as shown in FIG. 1I, and by reference number 150-1, the first virtual (e.g., virtual machine 1) may receive a notification identifying the hardware 1 event based on execution of the callback script for the first hardware component (e.g., hardware 1). As shown by reference number 150-2, the second virtual machine (e.g., virtual machine 2) may receive a notification identifying the hardware 1 event based on execution of the callback script for the first hardware component (e.g., hardware 1), and may receive a notification identifying the hardware 2 event based on execution of the callback script for the second hardware component (e.g., hardware 2). As shown by reference number 150-3, the fourth virtual machine (e.g., virtual machine 4) may receive a notification identifying the hardware 3 event based on execution of the callback script for the third hardware component (e.g., hardware 3).

In some implementations, the host platform may perform one or more actions based on execution of the callback scripts. For example, the host platform may provide, to one or more of the virtual machines, notifications indicating occurrences of events associated with one or more hardware components, as described above in connection with FIG. 1I; may collect data associated with one or more hardware components based on execution of one or more callback scripts; may alter states associated with one or more hardware components (e.g., switch processors, shut down interfaces, utilize additional processors, initiate a cooling fan, and/or the like) based on execution of one or more callback scripts; and/or the like.

In this way, a virtual machine may be aware of information and/or issues associated with a physical host providing the virtual machine, which reduces or prevents traffic outages associated with the physical host (e.g., that cause traffic to be lost, cause traffic to be delayed, require re-routing of traffic, and/or the like). This conserves computing resources (e.g., processing resources, memory resources, and/or the like), networking resources, and/or the like that would otherwise be wasted in identifying and/or correcting the issues associated with the physical host, identifying and/or correcting the traffic outage, re-routing traffic, locating lost traffic, and/or the like (e.g., which can be prevented by switching processors, shutting down interfaces, utilizing additional processors, initiating a cooling fan, and/or the like). Furthermore, implementations described herein use a rigorous, computerized process to perform tasks that were not previously performed. For example, currently there does not exist a technique that provides state information and/or issues associated with a physical host to a virtual machine.

As indicated above, FIGS. 1A-1I are provided merely as examples. Other examples may differ from what is described with regard to FIGS. 1A-1I.

Figure 2:
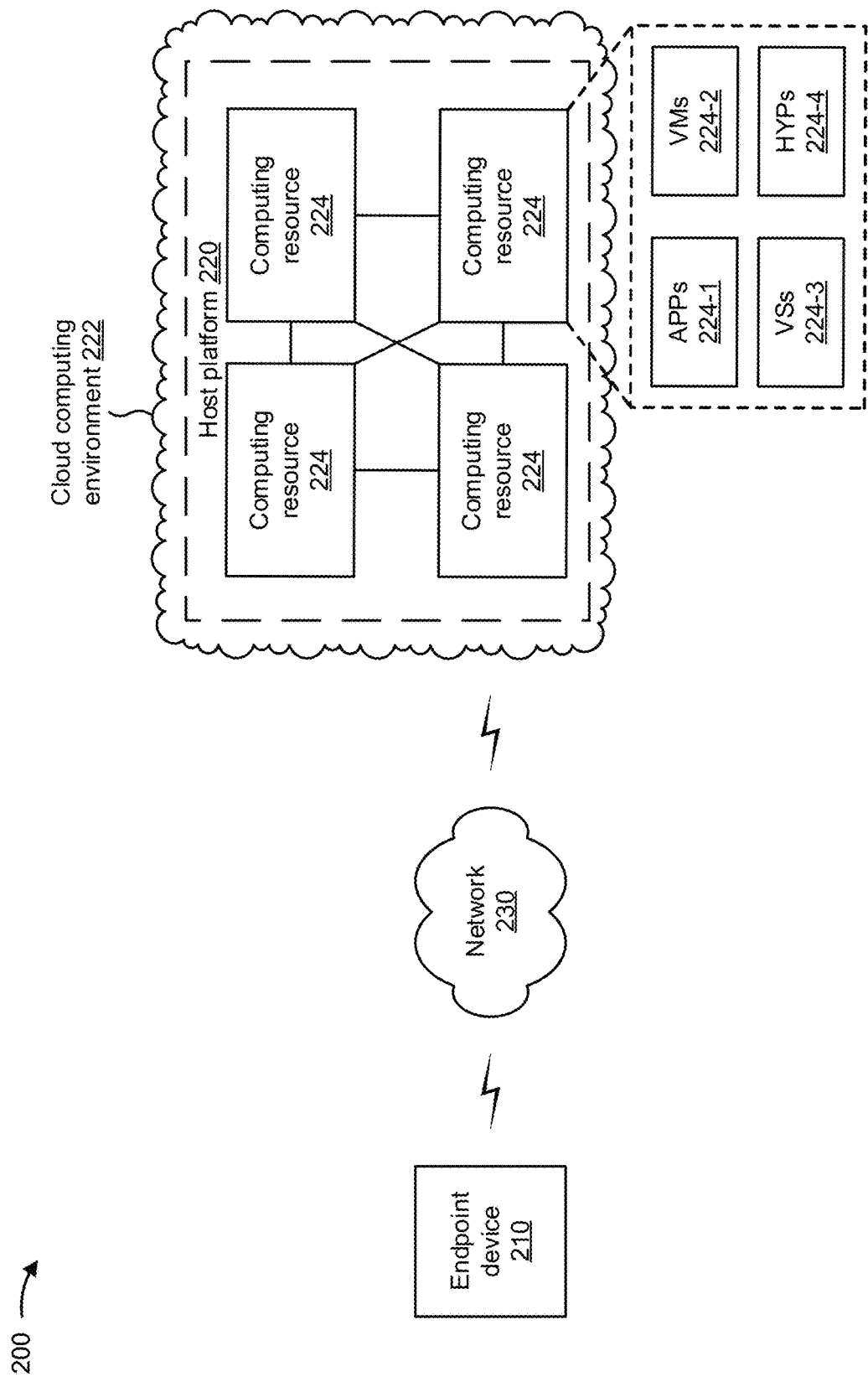
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an endpoint device 210, a host platform 220, and a network 230. Devices of environment 200 may interconnect via wired connections, wireless connections, or a combination of wired and wireless connections.

Endpoint device 210 includes one or more devices capable of receiving, generating, storing, processing, and/or providing information, such as information described herein. For example, endpoint device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, endpoint device 210 may receive information from and/or transmit information to host platform 220, via network 230. In some implementations, endpoint device 210 may receive network traffic from and/or may provide network traffic to other endpoint devices 210 via network 230.

Host platform 220 includes one or more devices that provide physical host hardware state information to virtual machines deployed on the physical host. In some implementations, host platform 220 may be designed to be modular such that certain software components may be swapped in or out depending on a particular need. As such, host platform 220 may be easily and/or quickly reconfigured for different uses. In some implementations, host platform 220 may receive information from and/or transmit information to one or more endpoint devices 210.

In some implementations, as shown, host platform 220 may be hosted in a cloud computing environment 222. Notably, while implementations described herein describe host platform 220 as being hosted in cloud computing environment 222, in some implementations, host platform 220 may not be cloud-based (i.e., may be implemented outside of a cloud computing environment) or may be partially cloud-based.

Cloud computing environment 222 includes an environment that hosts host platform 220. Cloud computing environment 222 may provide computation, software, data access, storage, etc., services that do not require end-user knowledge of a physical location and configuration of system(s) and/or device(s) that hosts host platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host host platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by endpoint device 210. Application 224-1 may eliminate a need to install and execute the software applications on endpoint device 210. For example, application 224-1 may include software associated with host platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of endpoint device 210 or an operator of host platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
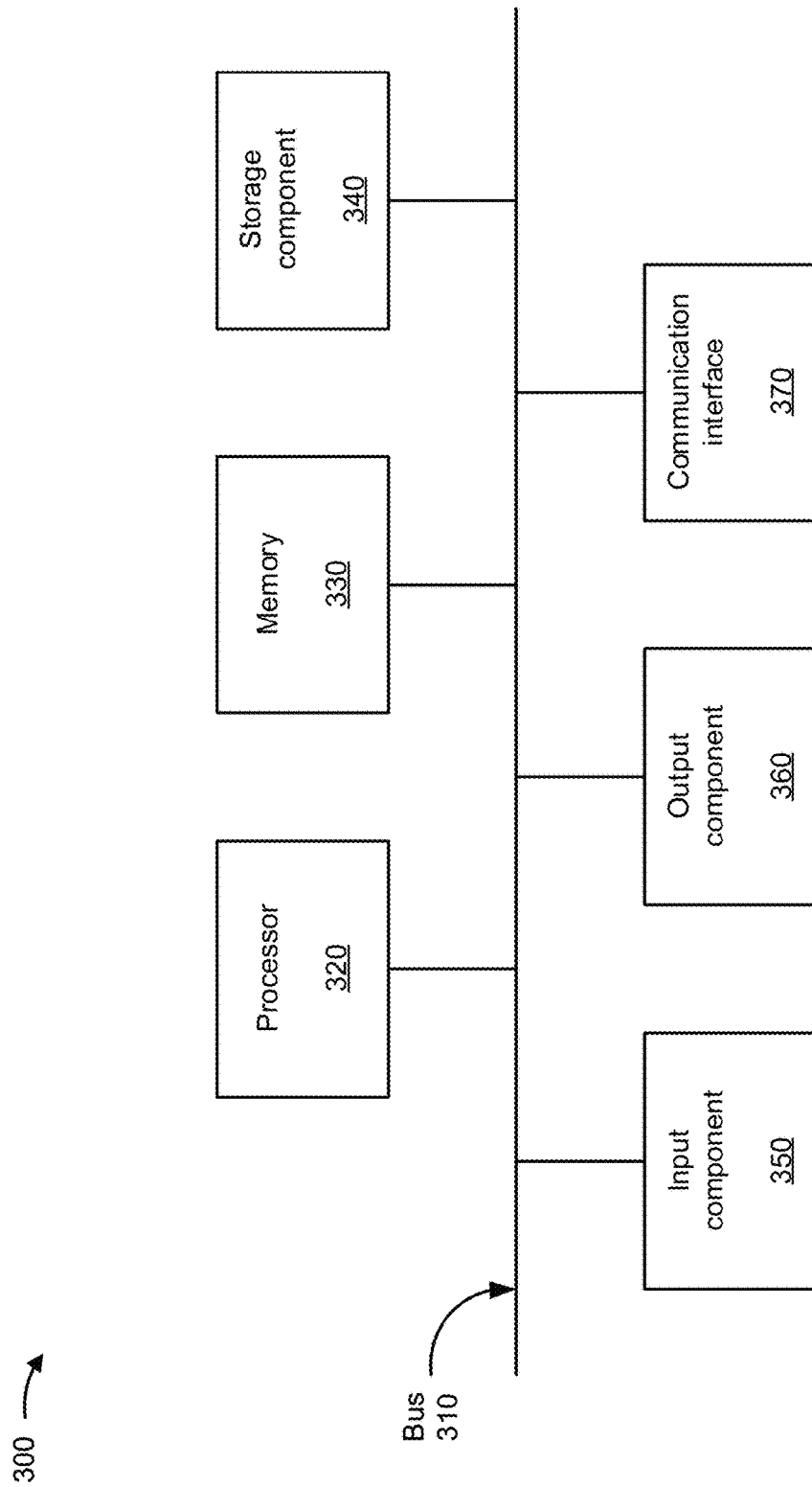
FIG. 3 is a diagram of example components of one or more devices of FIG. 2.

FIG. 3 is a diagram of example components of a device 300. Device 300 may correspond to endpoint device 210, host platform 220, and/or computing resource 224. In some implementations, endpoint device 210, host platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for providing physical host hardware state information to virtual machines deployed on the physical host. In some implementations, one or more process blocks of FIG. 4 may be performed by a host platform (e.g., host platform 220). In some implementations, one or more process blocks of FIG. 4 may be performed by another device or a group of devices separate from or including the host platform, such as an endpoint device (e.g., endpoint device 210).

As shown in FIG. 4, process 400 may include receiving a request to register for an event associated with a hardware component of the device, wherein the request is received from a virtual machine deployed on the device (block 410). For example, the host platform (e.g., using computing resource 224, processor 320, communication interface 370, and/or the like) may receive a request to register for an event associated with a hardware component of the host platform, as described above. In some implementations, the request may be received from a virtual machine deployed on the host platform.

As further shown in FIG. 4, process 400 may include creating a path to a script associated with providing information about the event when the event occurs (block 420). For example, the host platform (e.g., using computing resource 224, processor 320, memory 330, and/or the like) may create a path to a script associated with providing information about the event when the event occurs, as described above.

As further shown in FIG. 4, process 400 may include providing the script to an event plugin associated with the event and the hardware component (block 430). For example, the host platform (e.g., using computing resource 224, processor 320, communication interface 370, and/or the like) may provide the script to an event plugin associated with the event and the hardware component, as described above.

As further shown in FIG. 4, process 400 may include registering the event plugin with a kernel associated with the device (block 440). For example, the host platform (e.g., using computing resource 224, processor 320, storage component 340, and/or the like) may register the event plugin with a kernel associated with the host platform, as described above.

As further shown in FIG. 4, process 400 may include receiving, from the kernel, information indicating occurrence of the event associated with the hardware component (block 450). For example, the host platform (e.g., using computing resource 224, processor 320, communication interface 370, and/or the like) may receive, from the kernel, information indicating occurrence of the event associated with the hardware component, as described above.

As further shown in FIG. 4, process 400 may include causing, via the event plugin, execution of the script based on the occurrence of the event associated with the hardware component (block 460). For example, the host platform (e.g., using computing resource 224, processor 320, memory 330, and/or the like) may cause, via the event plugin, execution of the script based on the occurrence of the event associated with the hardware component, as described above.

As further shown in FIG. 4, process 400 may include providing, based on execution of the script, a notification to the virtual machine the notification indicating the occurrence of the event associated with the hardware component (block 470). For example, the host platform (e.g., using computing resource 224, processor 320, memory 330, storage component 340, communication interface 370, and/or the like) may provide, based on execution of the script, a notification to the virtual machine and the notification indicating the occurrence of the event associated with the hardware component, as described above.

Process 400 may include additional implementations, such as any single implementation or any combination of implementations described below and/or in connection with one or more other processes described elsewhere herein.

In a first implementation, the host platform may cause, via the virtual machine, the notification to be provided to an endpoint device associated with the virtual machine.

In a second implementation, alone or in combination with the first implementation, the hardware component may include one or more of a bus, a processor, a memory, a storage component, an input component, an output component, or a communication interface.

In a third implementation, alone or in combination with one or more of the first and second implementations, the event may occur when a threshold associated with the hardware component is satisfied.

In a fourth implementation, alone or in combination with one or more of the first through third implementations, the host platform may receive, from the virtual machine, the script associated with providing information about the event.

In a fifth implementation, alone or in combination with one or more of the first through fourth implementations, the script may be predefined by the host platform in a guest operating system associated with the host platform.

In a sixth implementation, alone or in combination with one or more of the first through fifth implementations, when receiving the information indicating occurrence of the event associated with the hardware component, the host platform may receive, via the event plugin, the information indicating occurrence of the event associated with the hardware component.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for providing physical host hardware state information to virtual machines deployed on the physical host. In some implementations, one or more process blocks of FIG. 5 may be performed by a host platform (e.g., host platform 220). In some implementations, one or more process blocks of FIG. 5 may be performed by another device or a group of devices separate from or including the host platform, such as an endpoint device (e.g., endpoint device 210).

As shown in FIG. 5, process 500 may include receiving a request to register for an event associated with a hardware component of the device wherein the request is received from a virtual machine deployed on the device (block 510). For example, the host platform (e.g., using computing resource 224, processor 320, communication interface 370, and/or the like) may receive a request to register for an event associated with a hardware component of the host platform, as described above. In some implementations, the request may be received from a virtual machine deployed on the host platform.

As further shown in FIG. 5, process 500 may include creating a path to a script associated with providing information about the event when the event occurs (block 520). For example, the host platform (e.g., using computing resource 224, processor 320, memory 330, and/or the like) may create a path to a script associated with providing information about the event when the event occurs, as described above.

As further shown in FIG. 5, process 500 may include providing the script to an event plugin associated with the event and the hardware component (block 530). For example, the host platform (e.g., using computing resource 224, processor 320, communication interface 370, and/or the like) may provide the script to an event plugin associated with the event and the hardware component, as described above.

As further shown in FIG. 5, process 500 may include registering the event plugin with a kernel associated with the device (block 540). For example, the host platform (e.g., using computing resource 224, processor 320, storage component 340, and/or the like) may register the event plugin with a kernel associated with the host platform, as described above.

As further shown in FIG. 5, process 500 may include receiving, from the kernel, information indicating occurrence of the event associated with the hardware component (block 550). For example, the host platform (e.g., using computing resource 224, processor 320, communication interface 370, and/or the like) may receive, from the kernel, information indicating occurrence of the event associated with the hardware component, as described above.

As further shown in FIG. 5, process 500 may include causing, via the event plugin, execution of the script based on the occurrence of the event associated with the hardware component (block 560). For example, the host platform (e.g., using computing resource 224, processor 320, memory 330, and/or the like) may cause, via the event plugin, execution of the script based on the occurrence of the event associated with the hardware component, as described above.

As further shown in FIG. 5, process 500 may include providing, based on execution of the script, a notification to the virtual machine the notification indicating the occurrence of the event associated with the hardware component (block 570). For example, the host platform (e.g., using computing resource 224, processor 320, memory 330, storage component 340, communication interface 370, and/or the like) may provide, based on execution of the script, a notification to the virtual machine and the notification indicating the occurrence of the event associated with the hardware component, as described above.

As further shown in FIG. 5, process 500 may include causing, via the virtual machine, the notification to be provided to an endpoint device associated with the virtual machine (block 580). For example, the host platform (e.g., using computing resource 224, processor 320, memory 330, communication interface 370, and/or the like) may cause, via the virtual machine, the notification to be provided to an endpoint device associated with the virtual machine, as described above.

Process 500 may include additional implementations, such as any single implementation or any combination of implementations described below and/or in connection with one or more other processes described elsewhere herein.

In a first implementation, the host platform may receive another request to register for another event associated with another hardware component of the host platform, and may create another path to another script associated with providing information about the other event when the other event occurs. The host platform may provide the other script to another event plugin associated with the other event and the other hardware component, and may register the other event plugin with the kernel. The host platform may receive, from the kernel, information indicating occurrence of the other event associated with the other hardware component, and may cause, via the other event plugin, execution of the other script based on the occurrence of the other event associated with the other hardware component. The host platform may provide, based on execution of the other script, another notification to the other virtual machine.

In a second implementation, alone or in combination with the first implementation, the host platform may perform one or more actions based on the execution of the script.

In a third implementation, alone or in combination with one or more of the first and second implementations, when performing the one or more actions based on the execution of the script, the host platform may collect data associated with the hardware component based on the execution of the script, or may alter a state associated with the hardware component based on the execution of the script.

In a fourth implementation, alone or in combination with one or more of the first through third implementations, the script may include one or more commands customized to provide information about the event, when the event occurs, to the virtual machine.

In a fifth implementation, alone or in combination with one or more of the first through fourth implementations, the event may include one or more of a load on the hardware component exceeding a predetermined load threshold, when the hardware component is a processor; a temperature of the hardware component exceeding a predetermined temperature threshold, when the hardware component is a power supply; or a utilization of the hardware component exceeding a predetermined utilization threshold, when the hardware component is an interface.

In a sixth implementation, alone or in combination with one or more of the first through fifth implementations, when receiving the request to register for the event associated with the hardware component, the host platform may receive the request to register for the event associated with the hardware component via an application programming interface.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for providing physical host hardware state information to virtual machines deployed on the physical host. In some implementations, one or more process blocks of FIG. 6 may be performed by a host platform (e.g., host platform 220). In some implementations, one or more process blocks of FIG. 6 may be performed by another device or a group of devices separate from or including the host platform, such as an endpoint device (e.g., endpoint device 210).

As shown in FIG. 6, process 600 may include receiving a request to register for an event associated with a hardware component of the device wherein the request is received from a virtual machine deployed on the device (block 610). For example, the host platform (e.g., using computing resource 224, processor 320, communication interface 370, and/or the like) may receive a request to register for an event associated with a hardware component of the host platform, as described above. In some implementations, the request may be received from a virtual machine deployed on the host platform.

As further shown in FIG. 6, process 600 may include creating a path to a script associated with providing information about the event when the event occurs (block 620). For example, the host platform (e.g., using computing resource 224, processor 320, memory 330, and/or the like) may create a path to a script associated with providing information about the event when the event occurs, as described above.

As further shown in FIG. 6, process 600 may include providing the script to an event plugin associated with the event and the hardware component (block 630). For example, the host platform (e.g., using computing resource 224, processor 320, memory 330, communication interface 370, and/or the like) may provide the script to an event plugin associated with the event and the hardware component, as described above.

As further shown in FIG. 6, process 600 may include registering the event plugin with a kernel associated with the device (block 640). For example, the host platform (e.g., using computing resource 224, processor 320, storage component 340, and/or the like) may register the event plugin with a kernel associated with the host platform, as described above.

As further shown in FIG. 6, process 600 may include receiving, from the kernel, information indicating occurrence of the event associated with the hardware component (block 650). For example, the host platform (e.g., using computing resource 224, processor 320, communication interface 370, and/or the like) may receive, from the kernel, information indicating occurrence of the event associated with the hardware component, as described above.

As further shown in FIG. 6, process 600 may include causing, via the event plugin, execution of the script based on the occurrence of the event associated with the hardware component (block 660). For example, the host platform (e.g., using computing resource 224, processor 320, memory 330, storage component 340, and/or the like) may cause, via the event plugin, execution of the script based on the occurrence of the event associated with the hardware component, as described above.

As further shown in FIG. 6, process 600 may include performing one or more actions based on execution of the script (block 670). For example, the host platform (e.g., using computing resource 224, processor 320, memory 330, communication interface 370, and/or the like) may perform one or more actions based on execution of the script, as described above.

Process 600 may include additional implementations, such as any single implementation or any combination of implementations described below and/or in connection with one or more other processes described elsewhere herein.

In a first implementation, when performing the one or more actions based on the execution of the script, the host platform may one or more of collect data associated with the hardware component based on the execution of the script, alter a state associated with the hardware component based on the execution of the script, or provide a notification to the virtual machine based on the execution of the script, the notification indicating the occurrence of the event associated with the hardware component.

In a second implementation, alone or in combination with the first implementation, the event may occur when a threshold associated with the hardware component is satisfied.

In a third implementation, alone or in combination with one or more of the first and second implementations, the host platform may receive, from the virtual machine, the script associated with providing information about the event.

In a fourth implementation, alone or in combination with one or more of the first through third implementations, the script may be predefined by the host platform in a guest operating system associated with the host platform.

In a fifth implementation, alone or in combination with one or more of the first through fourth implementations, the script may include one or more commands customized to provide information about the event, when the event occurs, to the virtual machine.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    providing, by a device and to an event plugin associated with a hardware component of the device, a script associated with providing information about an event associated with the hardware component;
    receiving, by the device and from a kernel, information indicating that the event occurred,
        wherein the kernel is associated with the device, and
        wherein the kernel is registered with the event plugin;
    causing, by the device, via the event plugin, and based on the event occurring, execution of the script; and
    providing, by the device and based on the execution of the script, a notification to a virtual machine implemented on the device,
        wherein the notification indicates that the event occurred.

2. The method of claim 1, further comprising:
    creating a path to the script associated with providing information about the event,
        wherein the script is predefined in a guest operating system associated with the device.

3. The method of claim 1, further comprising:
    receiving, from the virtual machine, a request to register for the event; and
    creating a path to the script associated with providing information about the event.

4. The method of claim 1, further comprising:
    providing information associated with all events associated with the hardware component; and
    discarding information about one or more events not associated with the event plugin that is registered with the kernel.

5. The method of claim 1, wherein the event occurs when a threshold associated with the hardware component is satisfied.

6. The method of claim 1, further comprising:
    altering, based on the execution of the script, a state associated with the hardware component.

7. The method of claim 1, further comprising:
    providing, by the virtual machine, the script to a state propagation component, associated with the device, via a system management basic input output system string.

8. A device, comprising:
    one or more memories; and
    one or more processors to:
        provide, to an event plugin associated with a hardware component of the device, a script associated with providing information about an event associated with the hardware component;
        register the event plugin with a kernel associated with the device;
        receive, from the kernel, information indicating that the event occurred;
        cause, via the event plugin and based on the event occurring, execution of the script; and
        provide, based on the execution of the script, a notification to a virtual machine implemented on the device,
            wherein the notification indicates that the event occurred.

9. The device of claim 8, wherein the one or more processors are further to:
    create a path to the script associated with providing information about the event,
        wherein the script is predefined in a guest operating system associated with the device.

10. The device of claim 8, wherein the one or more processors are further to:
    receive, from the virtual machine, a request to register for the event; and
    create a path to the script associated with providing information about the event.

11. The device of claim 8, wherein the one or more processors are further to:

provide information associated with all events associated with the hardware component; and discard information about one or more events not associated with the event plugin that is registered with the kernel.

12. The device of claim 8, wherein the event occurs when a threshold associated with the hardware component is satisfied.

13. The device of claim 8, wherein the one or more processors are further to:

alter, based on the execution of the script, a state associated with the hardware component.

14. The virtual machine of claim 8, wherein the one or more processors are further to:

provide the script to a state propagation component, associated with the device, via a system management basic input output system string.

15. A non-transitory computer-readable medium storing a set of instructions, the set of instructions comprising:

one or more instructions that, when executed by one or more processors of a device, cause the device to:

provide, to an event plugin associated with a hardware component of the device, a script associated with providing information about an event associated with the hardware component;

receive, from a kernel, information indicating that the event occurred,
wherein the kernel is registered with the event plugin;

cause, via the event plugin and based on the event occurring, execution of the script; and provide, based on the execution of the script, a notification to a virtual machine implemented on the device, wherein the notification indicates that the event occurred.

16. The non-transitory computer-readable medium of claim 15, wherein the one or more instructions further cause the device to:

create a path to the script associated with providing information about the event,
wherein the script is predefined in a guest operating system associated with the device.

17. The non-transitory computer-readable medium of claim 15, wherein the one or more instructions further cause the device to:

receive, from the virtual machine, a request to register for the event; and create a path to the script associated with providing information about the event.

18. The non-transitory computer-readable medium of claim 15, wherein the one or more instructions further cause the device to:

provide information associated with all events associated with the hardware component; and discard information about one or more events not associated with the event plugin that is registered with the kernel.

19. The non-transitory computer-readable medium of claim 15, wherein the event occurs when a threshold associated with the hardware component is satisfied.

20. The non-transitory computer-readable medium of claim 15, wherein the one or more instructions further cause the device to:

alter, based on the execution of the script, a state associated with the hardware component.

* * * * *